(12) United States Patent
Müller et al.

(10) Patent No.: US 7,540,299 B2
(45) Date of Patent: Jun. 2, 2009

(54) APPARATUS AND METHOD FOR COOLING A CLUTCH OF A MOTOR VEHICLE

(75) Inventors: Eric Müller, Kaiserslautern (DE); Manfred Homm, Bühl-Neusatz (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 308 days.

(21) Appl. No.: 11/330,717

(22) Filed: Jan. 12, 2006

(65) Prior Publication Data

US 2006/0174950 A1   Aug. 10, 2006

(30) Foreign Application Priority Data

Jan. 13, 2005   (DE) .................. 10 2005 001 573

(51) Int. Cl.
*G05D 11/00* (2006.01)
(52) U.S. Cl. ............... 137/118.06; 137/565.13; 137/115.15
(58) Field of Classification Search ........... 137/433, 137/565.13, 565.15, 625.48, 115.14, 115.21, 137/118.02, 118.06
See application file for complete search history.

(56) References Cited

U.S. PATENT DOCUMENTS

| 3,862,676 A | 1/1975 | Schall ................. 477/175 |
| 4,781,279 A | 11/1988 | Georg ................. 192/3.3 |
| 4,880,091 A * | 11/1989 | Hasegawa et al. ............ 192/3.3 |
| 5,314,385 A * | 5/1994 | Haley et al. ................. 474/28 |
| 2004/0211469 A1 | 10/2004 | Müller ................. 137/535 |

FOREIGN PATENT DOCUMENTS

| DE | 35 32 673 A1 | 3/1986 |
| DE | 10 2004 005 790 A1 | 2/2004 |
| DE | 10 2004 005790 A1 | 8/2004 |
| GB | 706853 | 4/1954 |
| GB | 2 081 413 A | 2/1982 |

\* cited by examiner

*Primary Examiner*—Stephen M Hepperle
*Assistant Examiner*—William McCalister
(74) *Attorney, Agent, or Firm*—Alfred J. Mangels

(57) ABSTRACT

A method and apparatus for cooling a clutch of a motor vehicle by controlling a valve through which a coolant circuit is coupled with a pump circuit. The valve includes a control piston that is movable at least to actuate a connection between the coolant circuit and the pump circuit.

12 Claims, 2 Drawing Sheets

APPARATUS AND METHOD FOR COOLING A CLUTCH OF A MOTOR VEHICLE

BACKGROUND OF THE INVENTION

1. Field of the Invention

The present invention relates to apparatus and a method for cooling a clutch of a motor vehicle utilizing a valve through which a coolant circuit can be coupled with a pump circuit.

2. Description of the Related Art

Apparatus and a method for cooling a clutch of a motor vehicle are known in the field of automotive technology. The known apparatus is a system that has two valves. A first valve is connected to a return conduit and to a supply conduit of the coolant circuit that is used for cooling the clutch. Additionally, in the known system a second valve in the form of a minimum pressure valve is necessary. The minimum pressure valve is coupled to the valve for cooling the clutch and to a pump circuit. Because the minimum pressure valve is needed to actuate a predetermined pressure, a corresponding backpressure arises in the coolant circuit.

The function of the valve for cooling the clutch is to control the flow of coolant to the clutch. In the known system the minimum pressure valve prevents air from entering the suction section of the pump for the pump flow through the return conduit of the coolant circuit during the start-up phase, which would prevent oil from being delivered from a supply tank. In addition to the disadvantage due to the occurrence of the backpressure in the coolant circuit described earlier, the known system has the further disadvantage that a larger construction space is needed because of the two necessary valves.

Published patent specification DE 10 2004 005 790 A1 discloses a control, in particular a hydraulic control, having a directional valve to control a cooling system for a clutch and to ensure a suction function of a pump.

In the known control, it is absolutely necessary that the directional valve includes two control pistons in order to achieve the cooling of the clutch and also the suction function of the pump.

Accordingly, an object of the present invention is to propose apparatus and a method for cooling a clutch of a motor vehicle with a valve of the type named at the beginning, with which both the cooling function and the suction function can be ensured in every phase of operation, and in addition an especially compact and space-saving type of construction is achieved.

SUMMARY OF THE INVENTION

The object is achieved by apparatus for cooling a clutch of a motor vehicle with a valve through which a coolant circuit is coupled with a pump circuit. The valve has only one control piston, which is movable at least to control the connection between the coolant circuit and the pump circuit. In that way an especially compactly constructed system is achieved with the fewest possible parts for cooling the clutch, for example the clutch of a transmission, such as a CVT transmission, for example.

In order to ensure pump suction, for example during the start-up phase in the apparatus in accordance with the invention, the control piston can preferably be oriented automatically in a normal position so that the connection between the coolant circuit and the pump circuit is closed. In accordance with an advantageous refinement of the present invention, that can be achieved by a design in which a first end of the control piston is coupled with a spring element, or the like. The spring force of the spring element then acts on the first end of the control piston in such a way that the control piston is automatically held in its normal position to close the connection between the coolant circuit and the pump circuit. It is also conceivable that other design measures can be utilized, in order to ensure that the control piston is held in its normal position, which enables pump suction.

In a preferred embodiment of the present invention, the control piston can be moved out of its normal position to actuate the coolant flow only after a certain pressure has built up in the coolant circuit. By building up the pressure that is applied, as it were, by a back-up of the coolant, a force is brought to bear on the piston which is opposite in direction, for example, to the spring force of the spring element, in order to move the control piston out of its normal position in accordance with the desired cooling performance.

In accordance with a refinement, the system in accordance with the invention can preferably provide that the control piston has a plurality of sections, or the like, which correspond to the connection conduits, or the like, located in the valve housing to actuate the coolant flow and the pump flow. Therefore, by properly matching the connection conduits with the coolant circuit, the pump circuit, and possibly a pilot circuit, by moving the single necessary control piston appropriately, it is possible to achieve activation of the coolant circuit and the pump circuit. By moving the piston, it is possible through predetermined overlap lengths between the sections on the piston and the respective assigned connection conduits to close or open certain connections, so that a desired cooling performance can be achieved without any danger that the suction side of the pump will suck in air, for example. Oil, or the like, which is contained in a supply tank, can particularly be used as a cooling medium.

A possible embodiment of the present invention can provide for the control piston to be movably contained in a bore in the valve housing, so that the connection conduits are controllable through the assigned sections of the control piston. The respective connection conduits provided can be aligned perpendicular to the bore in the valve housing and can at least lead into the bore, so that a connection is achieved between the bore and each of the individual connection conduits. Any number of connection conduits and assigned sections can be chosen depending on need; preferably five connection conduits are used, each having an assigned section, in accordance with one embodiment of the present invention.

In the above-described embodiment of the system in accordance with the invention, a first connection conduit can be provided as the supply conduit for the pump flow, wherein a first section on the control piston, approximately cylindrical, is associated with the first connection conduit. It is also possible to use sections with other cross-sectional shapes. When the control piston has a cylindrical cross section, a cylindrical cross section for the sections is also an advantageous possibility.

A second connection conduit can be designed as the return conduit for the coolant flow, wherein a second approximately cylindrical section on the control piston is associated with the second connection conduit. The second connection conduit can be provided alongside the first connection conduit in the valve housing. The associated second section can preferably have a smaller diameter than the first section on the control piston. Thus, it is possible to achieve a connection between the return of the coolant flow and the pump flow along the length of the section in the longitudinal direction of the bore, if the control piston is moved in the longitudinal direction of the bore, so that the second section can be associated with both the first and the second connection conduits due to its length.

In accordance with a next refinement, in addition to the second connection conduit a third connection conduit can be provided as a first supply conduit for the coolant circuit, and a fourth connection conduit as a second supply conduit for the coolant circuit. Preferably, a third, approximately cylindrical, section on the control piston can be associated with the third connection conduit.

A further embodiment of the system in accordance with the invention can provide that the diameters of the first section and the third section are approximately equal. Since the second section is smaller in diameter and is positioned between the first section and the third section, there are transition areas between the second section and the first and third sections whose shape is somewhat rounded in a preferred embodiment of the present invention. That results in advantageous transition zones in terms of fluid dynamics.

In order to achieve an especially advantageous control possibility for regulating the supply of coolant flow, there are, for example, two supply conduits provided for the coolant flow, a remote area of the control piston being associated with the fourth connection conduit for the second supply conduit of the coolant circuit. In accordance with a further embodiment of the present invention, since the third connection conduit and the fourth connection conduit are connected to each other, it is possible to produce a backpressure in the two supply conduits of the coolant circuit; that pressure produces a force on the control piston over the surface of the remote zone, so that the control piston is moved against the spring force, causing the third connection conduit to be covered by the movement of the control piston, so that the coolant flow is reduced until a predetermined or desired coolant flow setting is reached.

In accordance with a next improvement, it can be provided that in addition to the fourth connection conduit there is present a fifth connection conduit as a control pressure conduit of a control circuit. The fifth connection conduit has associated with it a second end of the control piston as a surface to which the control pressure can be applied as needed, in order to be able to move the control piston against the spring force. The arrangement sequence of the connection conduits and of the assigned sections can also be changed, depending upon the application. For example, the number of connection conduits can also be changed.

When the system in accordance with the invention is used in a motor vehicle that has a continuously variable transmission (CVT), the two supply conduits of the coolant circuit can be routed to a jet pump in order to further consolidate the coolant flow. The system in accordance with the invention can, however, also be employed with other transmission systems.

Overall, in the system in accordance with the invention air aspiration can be avoided during the start-up phase, and depending upon need makes it possible to achieve either cooling with approximately constantly regulated coolant pressure, or cessation of the cooling, without a need for a plurality of valves and a plurality of control pistons.

The object underlying the invention is also achieved by a method for cooling a clutch of a motor vehicle, in which a valve is used through which a coolant circuit is coupled with a pump circuit. In accordance with the invention, the valve uses a control piston that is moved at least to actuate the connection between the coolant circuit and the pump circuit.

In accordance with a refinement of the invention, a method can provide that the connection between the coolant circuit and the pump circuit is closed when the control piston is in its closed position. In that manner, an optimal suction function can be achieved in the pump at the beginning by means of the proposed method.

In accordance with a preferred embodiment, it is possible that a control piston is moved from the normal position to actuate or set a desired coolant flow only after a predetermined pressure is built up in the coolant circuit. In the method in accordance with the invention, the coolant flow for cooling the clutch can be actuated after the start-up phase ends by the motion of the control piston.

In accordance with a refinement of the invention, it can be provided as a possible regulation situation for the method in accordance with the invention that the control piston is subjected to a force resulting from the pilot pressure. The pilot pressure is, for example, slightly weaker than the opposing spring force acting on the control piston, while a backpressure is built up in the supply conduit of the coolant circuit as a measure of the coolant flow volume. When a predetermined back pressure is reached the control piston is moved against the spring force, so that a connection is opened between the return conduit of the coolant circuit and the pump circuit, and at least part of the coolant flow is fed directly into the pump circuit to regulate the coolant flow. In that way cooling of the clutch will result while an approximately constant pressure is fed to the jet pump.

Another possible regulation situation can be achieved in connection with a further embodiment of the invention by subjecting the control piston to a force resulting from the pilot pressure, which force is greater than the opposing spring force acting on the control piston, and by the fact that the movement of the piston closes the connection between the return conduit of the coolant circuit and the supply conduit of the coolant circuit, so that the cooling of the clutch is ended. Accordingly, the cooling is interrupted by diverting the coolant from the return conduit of the coolant circuit into the pump circuit 2, if that is desired.

Preferably, the method in accordance with the invention can be employed with the proposed system. However, other possible applications are also conceivable.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
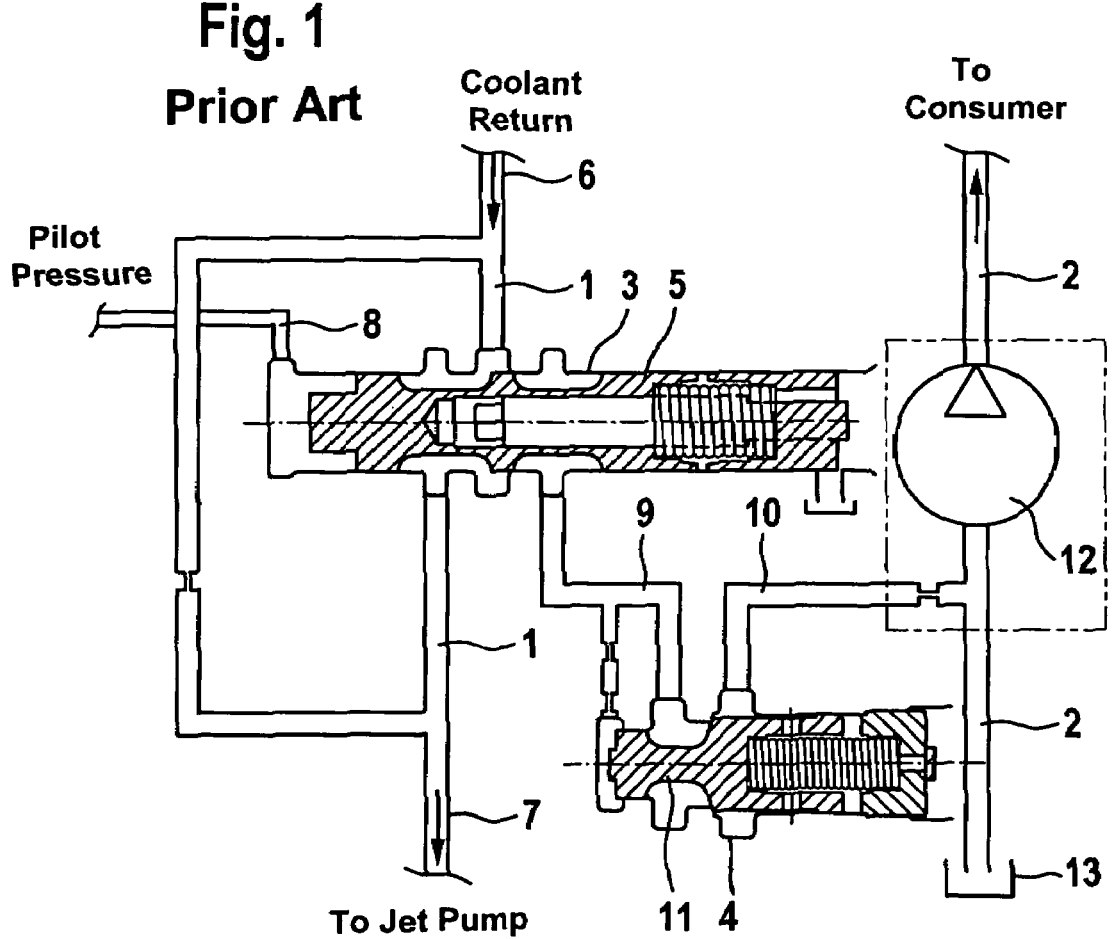
FIG. 1 is a schematic view of a known system for cooling a clutch of a motor vehicle.

FIG. 1 shows a schematic representation of a known system including two valves for cooling a clutch of a motor vehicle, and through which a coolant circuit 1 is coupled with a pump circuit 2.

A valve 3 for clutch cooling and a minimum pressure valve 4 are provided as the two valves. Clutch coolant valve 3 has a valve piston 5. Valve piston 5 is movably received in a bore of valve 3 and is spring-biased. Clutch coolant valve 3 is coupled with a return conduit 6 and a supply conduit 7 for the coolant flow, and with a pilot pressure conduit 8. Furthermore, clutch coolant valve 3 is connected to minimum pressure valve 4 through a conduit 9. Minimum pressure valve 4 also has a spring-loaded valve piston 11, and is connected to the pump circuit via a further conduit 10. Pump circuit 2 includes a pump 12, which is supplied with oil as coolant from a supply tank 13.

In the known system, for example, the coolant is used to cool the clutch (not shown) during its slipping phase. The coolant that is no longer needed flows back to pump 12. The function of clutch coolant valve 3 is to control the cooling of the clutch. The minimum pressure valve 4 prevents air from entering the suction section of pump 12 in pump circuit 2 through return conduit 6 of the coolant circuit during the start-up phase, which prevents oil from being delivered from supply tank 13.

Figure 2:
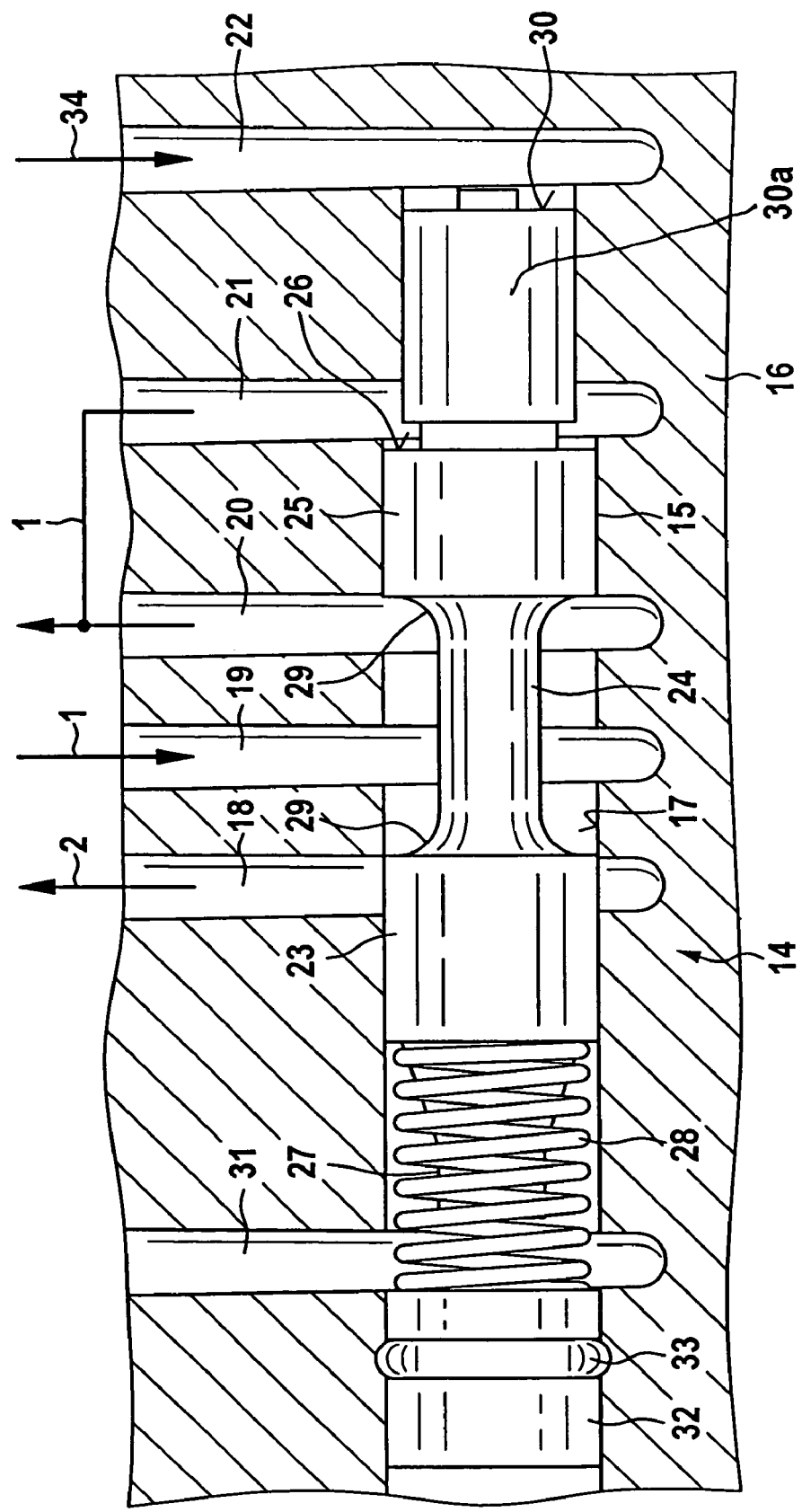
FIG. 2 is a fragmentary schematic view of an embodiment of a system in accordance with the present invention for cooling a clutch.

FIG. 2 shows a possible embodiment of a system with a valve arrangement in accordance with the invention for cooling a clutch of a motor vehicle. In the system in accordance with the invention, the two valves in the known system of FIG. 1 are replaced by one valve.

The system in accordance with the invention thus includes only one valve 14 with just one control piston 15, which is movably contained in a bore 17 provided in valve housing 16. Arranged perpendicular to bore 17 in valve housing 16 are a plurality of connection conduits 18, 19, 20, 21, 22, 31, each of which has a flow communication with bore 17. Control piston 15, which is movable in bore 17, has a plurality of sections or regions 23, 24, 25, 26, which correspond to connection conduits 18, 19, 20, 21, 22, 31 in such a way that coolant flow and pump flow can be controlled by the movement of control piston 15.

In accordance with the invention, in a normal position control piston 15 is oriented so that the connection between the coolant circuit 1 and pump circuit 2 is closed. That is accomplished by coupling a first end 27 of control piston 15 with a spring element 28, so that control piston 15 is held in its normal position by the spring force of spring element 28 acting on control piston 15. In the normal position, control piston 15 is at its right stop within valve housing 16. To control the coolant flow, control piston 15 is moved from its normal position only after a predetermined pressure is built up in coolant circuit 1.

First connection conduit 18 is designed as a supply conduit for pump circuit 2, wherein a first, somewhat cylindrical, section 23 on control piston 15 is associated with first connection conduit 18. Along with first connection conduit 18, second connection conduit 19 is designed as a return conduit of coolant circuit 1, wherein a second somewhat cylindrical section 24 on control piston 15 is associated with second connection conduit 19. Coolant circuit 1 and pump circuit 2, respectively, are indicated by arrows in FIG. 2. In addition to second connection conduit 19, there is a third connection conduit 20 provided as the first supply conduit of coolant circuit 1, and a fourth connection conduit 21 as the second supply conduit of coolant circuit 1.

A third, somewhat cylindrical, section 25 on control piston 15 is associated with third connection conduit 20. The diameter of second cylindrical section 24 is smaller than the diameters of both first section 23 and third section 25. Because second section 24 is positioned between first section 23 and third section 25, there are transition regions 29 between second section 24 and first section 23 and third section 25, respectively, which have a rounded shape in the exemplary embodiment shown.

An offset region 26 on control piston 15 is associated with fourth connection conduit 21. Third connection conduit 20 and fourth connection conduit 21 are connected with each other, and lead jointly to a jet pump (not shown), which further consolidates the coolant that is needed for cooling the clutch of a continuously variable transmission (CVT).

Finally, there is a fifth connection conduit 22 as the pilot pressure conduit of the control circuit; a second end 30 of control piston 15 at fourth section 30*a* is associated with fifth connection conduit 22. Fifth connection conduit 22 applies the pilot pressure to the surface of the second end 30 of control piston 15 to produce a force that acts against the spring force of spring element 28, so that control piston 15 is movable to control the coolant flow. Pilot circuit 34 is indicated in FIG. 2 with an arrow.

Furthermore, there is an additional, sixth connection conduit 31, which feeds into bore 17 in the region of the first end 27 of control piston 15. That sixth connection conduit 31 is not absolutely necessary, and it serves as a balancing channel to suitably damp the motion of control piston 15. Spring element 28, which is coupled with the first end 27 of control piston 15, is attached to a sealing plug 32; sealing plug 32 seals bore 17 with the help of a sealing ring 33.

The operation of the system in accordance with the invention, and of the method for cooling the clutch of a motor vehicle, in particular, with the illustrated valve arrangement, can be described as follows.

At the beginning of operations, a first task of valve arrangement 14 is to prevent the pump—not shown in further detail—from aspirating air in the start-up phase through second connection conduit 19, which serves as the return conduit of coolant circuit 1. During the start-up phase there is little or no pressure in the system, since the pump is not yet in operation. In that phase or in the normal position, control piston 15 is moved to the right as far as the stop in the area of the fifth connection conduit 22 by the spring force of spring element 28. In that normal position control piston 15 closes, with the first section 23, the connection between the second connection conduit 19, constructed as the return conduit for coolant circuit 1, and the first connection conduit 18, constructed as the supply conduit for pump circuit 2. With an appropriate overlap length of the first section 23 it is thereby ensured that the pump draws coolant or oil from a supply tank at the start, thus preventing air from entering pump circuit 2 from the return conduit of the coolant flow.

After the system is started, two additional standard situations, for example, can occur.

In a first situation, clutch cooling is supposed to occur at an approximately constant pressure, which is fed to the jet pump. In that first situation, a moderate pilot pressure of 2.5 bar, for example, in the fifth connection conduit 22 is applied to the face of the second end 30 of control piston 15. That pilot pressure produces a force on control piston 15, which is just slightly weaker than the contrary spring force of spring element 28. Hence control piston 15 remains initially in its normal position.

In that normal position, the coolant coming from the second connection conduit 19, which is constructed as the return conduit of coolant circuit 1, is entirely routed through third connection conduit 20 to cool the clutch. The coolant flow, which is routed to the jet pump, brings about a backpressure in the third and fourth connection conduits, produced by the jet pump. That backpressure is a measure of the coolant flow volume through the clutch, and should be controlled to a value of, for example, 4 bar. For that purpose, the backpressure acts on the surface of the offset area 26 of control piston 15. That causes an additional force to be applied to control piston 15, which operates opposite to the spring force of spring element 28.

When the backpressure reaches the desired value of, for example, 4 bar, control piston 15 is brought from its normal position to the control position shown in FIG. 2. In that control position, the forces that are acting on control piston 15 are in equilibrium. As soon as the backpressure rises again, control piston 15 is moved further to the left against the spring force of spring element 28, and the connection between second connection conduit 19 and first connection conduit 18 is opened, so that at least part of the coolant flow is routed directly to the pump. That prevents the pressure at the jet pump from rising further. If the pressure in first connection conduit 18 is higher than the back pressure in third connection conduit 20 and fourth connection conduit 21, control piston 15 is moved even further to the left, so that the connection between second connection conduit 19 and third connection conduit is at least partially closed.

In a second possible control situation cooling is no longer desired, so the coolant is routed from the return conduit of coolant circuit 1 into pump circuit 2.

In that control situation, a maximum pilot pressure of, for example, 5 bar in fifth connection conduit 22 is applied to the face of the second end 30 of control piston 15. That causes control piston 15 to be brought to the left stop position against the spring force of spring element 28. In that position the connection between second connection conduit 19, configured as the return conduit of the coolant flow, and third connection conduit 20, configured as the supply conduit of coolant circuit 1, is closed, so that no coolant or oil can reach the clutch or the jet pump. That ends the cooling of the clutch. The connection between second connection conduit 19 and first connection conduit 18, which leads to the pump, is completely open in that position of control piston 15, 50 that the coolant coming from second connection conduit 19 can be completely routed through first connection conduit 18 to the pump.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. Apparatus for cooling a clutch of a motor vehicle, said apparatus comprising: a unitary valve having a housing through which a coolant circuit is coupled with a pump circuit, wherein the valve includes a unitary control piston that is movable within the housing at least a distance sufficient to effectuate a connection between the coolant circuit and the pump circuit, wherein the control piston includes first and second opposite ends and only first, second, and third axially spaced cylindrical sections between the first and second opposite ends and that are operative with respect to respective connection conduits located in the valve housing for controlling flow through the valve to and from the coolant circuit and the pump circuit; a first connection conduit provided in the valve housing as a supply conduit of the pump circuit and with which the first cylindrical section of the control piston is operatively associated: a second connection conduit provided in the valve housing as a return conduit of the coolant circuit and with which the second cylindrical section of the control piston is operatively associated: a third connection conduit provided in the valve housing and operative as a first supply conduit of the coolant circuit, and a fourth connection conduit provided in the valve housing and operative as a second supply conduit of the coolant circuit, wherein the third cylindrical section of the control piston is operatively associated with the third connection conduit; wherein the second cylindrical section of the control piston has a diameter that is smaller than a diameter of each of the first and third cylindrical sections of the control piston and is positioned between the first and the third cylindrical sections; and wherein transition regions between the second cylindrical section and the first and third cylindrical sections have a rounded shape.

2. Apparatus in accordance with claim 1, wherein the control piston is oriented in a normal position so that the connection between the coolant circuit and the pump circuit is closed.

3. Apparatus in accordance with claim 2, wherein the first end of the control piston is coupled with a spring element.

4. Apparatus in accordance with claim 2, wherein the control piston for activating coolant flow is not movable out of the normal position until after a predetermined pressure has been built up in the coolant circuit.

5. Apparatus in accordance with claim 1, wherein the control piston is movably received in a bore of the valve housing such that flow through the connection conduits is control led by the respective cylindrical sections of the control piston.

6. Apparatus in accordance with claim 1, wherein the third cylindrical section of the control piston is operatively associated with the fourth connection conduit.

7. Apparatus in accordance with claim 1, wherein the third connection conduit and the fourth connection conduit are in communication with each other.

8. Apparatus in accordance with claim 1, wherein a fifth connection conduit is provided in the valve housing and communicates with a pilot pressure conduit of a pilot circuit, with which the second end of the control piston is operatively associated.

9. A method for cooling a clutch of a motor vehicle, said method comprising the steps of: coupling a coolant circuit with a pump circuit through a control valve; moving a control piston within the valve to effectuate at least a connection between the coolant circuit and the pump circuit; providing a pilot pressure force against the control piston, wherein the pilot pressure force is weaker than an opposing spring force acting on the control piston; building a backpressure in a supply conduit of the coolant circuit as a measure of coolant flow volume; and moving the control piston against the spring force when a predetermined back pressure is reached, so that a connection is opened between a return conduit of the coolant circuit and the pump circuit; and feeding at least part of the coolant flow directly into the pump circuit to regulate the coolant flow.

10. A method in accordance with claim 9, including the step of closing the connection between the coolant circuit and the pump circuit when the control piston is in a normal position.

11. A method in accordance with claim 10, wherein the control piston for controlling flow to the coolant circuit is not movable out of the normal position until after a predetermined pressure has been built up in the coolant circuit.

12. A method in accordance with claim 9, including the steps of: providing a pilot pressure force against the control piston, wherein the pilot pressure force is greater than an opposing spring force acting on the control piston; and moving the control piston to close a connection between a return conduit of the coolant circuit and a supply conduit of the coolant circuit, so that cooling of the clutch is ended.

* * * * *